United States Patent [19]

Rollins et al.

[11] 4,398,615

[45] Aug. 16, 1983

[54] AIR CUSHION VEHICLES

[75] Inventors: Kay Rollins; Anthony N. Key, both of Ryde; Thomas F. Arlotte, Newport, all of England

[73] Assignee: British Hovercraft Corp. Ltd., Yeovil, England

[21] Appl. No.: 283,142

[22] Filed: Jul. 14, 1981

[30] Foreign Application Priority Data

Jul. 14, 1980 [GB] United Kingdom ............... 8022984

[51] Int. Cl.³ .............................................. B60V 1/16
[52] U.S. Cl. .................................................... 180/127
[58] Field of Search ............... 180/120, 121, 122, 127, 180/128

[56] References Cited

U.S. PATENT DOCUMENTS 3,536,156 10/1970 Crago ............................. 180/127 X
3,907,061 9/1975 Chapman et al. .................. 180/120

Primary Examiner—John A. Pekar
Attorney, Agent, or Firm—Larson and Taylor

[57] ABSTRACT

The inflated geometry of an inflatable skirt wall constituting at least a part of the cushion sealing means on an air cushion vehicle (A.C.V.) is changed to effect a shift in the center of pressure of the vehicle supporting air cushion for assisting in directional control or to reduce the overall width dimension of the A.C.V. when the skirt wall projects outwardly of vehicle rigid body structure while maintaining a skirt structure sufficient to contain an air cushion for slow speed maneuvering of the A.C.V. Means for changing the inflated skirt wall geometry comprise duct means and co-operating valve means for controlling supply of pressurized air to one or more compartments of the skirt structure, and further duct means and co-operating valve means for venting air from said one or more compartments.

6 Claims, 4 Drawing Figures

AIR CUSHION VEHICLES

BACKGROUND OF THE INVENTION

(1) FIELD OF THE INVENTION

THIS INVENTION relates to air cushion vehicles (A.C.V.) and is particularly concerned with means for varying the geometry of inflatable skirt structures forming at least a part of the vehicle cushion sealing means.

(2) DESCRIPTION OF THE PRIOR ART

The cushion sealing means on an A.C.V. may include inflatable skirt structures depending below the main hull of the vehicle, whose primary purpose is to contain the air cushion; inflatable keel structures, extending lengthwise of the vehicle below the underside of the main hull for increasing the roll stability of the vehicle; and inflatable compartmentation structures, extending laterally of the vehicle below the underside of the main hull to divide the air cushion area into fore and aft compartments, for increasing the pitch stability of the vehicle.

In order to effect directional and/or trim control of an A.C.V. it may be necessary to move one or more of the inflatable skirt structures either towards and away from, or laterally, relative to the surface over which the vehicle travels. Thus, for example, fully flexible skirted A.C.V.'s tend to roll outwardly under the action of centrifugal force when turning about a remote point. Amongst the various means that may be used to counteract this tendency and to assist in directional control of the A.C.V. are lift vectoring devices. These devices can be divided into two categories; those which physically move the cushion and hence the centre of pressure; and those which modify the cushion pressure distribution thus changing the centre of pressure position and hence lift moment about the centre of gravity. Both of these types may be used to provide rolling and/or pitching moments and hence side and thrust forces, and should surface contact occur at forward speed, some yawing moment. By effecting inward movement of the skirt hemline along that side of the A.C.V. which is on the inside of a turn, the position of the centre of pressure of the cushion can be shifted with respect to the centre of gravity to produce a lift moment that counteracts the tendency of the vehicle to roll outwardly. Alternatively, or additionally, the hemline of the skirt may be lifted along that side of the A.C.V. which is on the inside of the turn, so as to allow cushion air to escape, thereby modifying the cushion pressure distribution so that the position of the centre of pressure is shifted.

Heretofore, movement of the flexible skirt for such purposes has generally been effected by mechanical means such as cables and pulleys, or levers and rod arms, operated by hydraulic jacks. Examples of such systems are to be found in U.S. Pat. Nos. 3,288,235 and 3,481,423. Such systems introduce considerable complexity at the underside of the vehicle, which is exposed to a very corrosive environment when the vehicle is operating over a sea surface. This has given rise to problems such as failure of the hydraulic jacks, due to sticking or leakage of hydraulic fluid. Another disadvantage with such systems is that unless a longitudinally extending rigid rod is interposed in the system between the hydraulic jacks and the connection to the flexible skirt, the hydraulic jacks will not give equal movement of the hemline of the skirt over that length of the skirt on which they are acting. Also, in order that cushion pressure may be effective over substantially the complete area of the underside of the rigid base structure of the A.C.V., the inflatable skirt structure may project outwardly from the peripheral sides of the A.C.V. rigid body structure. This is advantageous in that the skirt structure is able to deflect in an upward direction, away from a ground or water surface over which the A.C.V. is operating, without being substantially obstructed by the rigid body structure. However, it increases the overall width dimension of the A.C.V. which may give rise to problems when it is required to manoeuvre the A.C.V. into a restricted opening such as a hangar building or the well deck of a carrier ship.

It has been proposed in U.S. Pat. Nos. 3,467,215 and 3,373,839 to provide inflatable skirt structures that project outwardly of the sides of the A.C.V. rigid body structure when inflated and which collapse inwardly towards the rigid body structure when deflated so as to reduce the overall width dimension of the A.C.V. when it is non-operational. However, this does not permit the A.C.V. to be moved under its own power and it has been further proposed in U.K. Pat. No. 1,494,733 to provide an A.C.V., having inflatable skirt structure similar to that disclosed in U.S. Pat. No. 3,467,215, with supporting wheels whereby it may be moved when not cushion supported by the propulsive means of the A.C.V. supplemented, if desired, by diverting pressurised air from the vehicle lift fan to reaction outlets to produce reaction thrust. These wheels may be retractable into recesses in the rigid base structure so as not to obstruct the cushion area in cushion-borne operation. However, the weight of the wheels and any retraction mechanism reduces the payload that the vehicle is able to carry and adds complexity at the underside of the rigid base structure where it is most likely to suffer damage.

SUMMARY OF THE INVENTION

It is an object of the present invention to provide means for varying the geometry of an A.C.V. inflatable skirt structure that considerably reduces the mechanical complexity of prior art systems whereby the skirt structure is moved in order to effect a shift in the centre of pressure of the vehicle supporting air cushion.

It is a further object of the present invention to provide such means for varying the geometry of an A.C.V. inflatable skirt structure which projects outwardly of the sides of the vehicle rigid body structure whereby the skirt structure may be partially collapsed to reduce the overall width dimension of the vehicle whilst maintaining a skirt structure sufficient to contain an air cushion for slow speed manoeuvring of the A.C.V.

In meeting these objects the broadest aspect of the present invention provides an air cushion vehicle (A.C.V.) having cushion sealing means including an inflatable skirt structure attached to and enclosing with rigid body structure of the A.C.V. at least one compartment, first duct means for communicating the or each compartment with a source of pressurised air on the A.C.V., first valve means co-operating with said first duct means to control flow of pressurized air from said pressurised air source to the or each compartment whereby said skirt structure may be inflated away from said rigid body structure to a first inflated geometrical shape, second duct means for communicating the or each compartment with ambient, second valve means co-operating with said second duct means to control venting of air from the or each compartment whereby the inflation pressure in the or each compartment may be varied to change the geometry of the inflated skirt structure.

In another aspect of the invention the objects are met by an A.C.V. having cushion sealing means at least partly constituted by an inflatable skirt structure comprising an inflatable bag member constructed from flexible impermeable sheet material attached to rigid body structure of the A.C.V. along attachment lines that are spaced apart and one of which is situated outboard of the other so as to enclose with said rigid body structure a space, a flexible impermeable web member having a first edge attached to the rigid body structure and a second opposed edge attached to the bag member along respective attachment lines on the rigid body structure and the bag member that are spaced between and substantially parallel with the attachment lines of the bag member to the rigid body structure and whereby said space enclosed by said bag member and said rigid body structure is divided into inboard and outboard compartments with the volume of said outboard compartment being disposed substantially outboard of the rigid body structure of the A.C.V. when the bag member is inflated, first duct means communicating between a source of pressurised air on said A.C.V. and said inboard compartment, second duct means communicating between said inboard and outboard compartments, third duct means communicating said outboard compartment to ambient, first valve means co-operating with said second duct means and adapted for closing said second duct means, and second valve means co-operating with said third duct means and adapted to control venting of said outboard compartment to ambient, said first and second valve means being controllable to vary the inflation pressure of said outboard compartment and thereby to effect changes in the geometry of the flexible skirt structure.

The bag member may be attached to the vehicle rigid body structure along the outboard attachment line by an inflatable member comprised by flexible impermeable sheet material extending between spaced lines of attachment on the vehicle rigid body structure to enclose with the structure a space which is adapted for inflation by pressurised air supplied through duct means communicating between the space and a source of pressurised air on the vehicle and adapted for closure by valve means co-operating with said duct means. Further duct means may be provided for communicating the space with ambient under control of further valve means co-operating with said further duct means.

Inflation air for the inflatable member may be supplied by an air ejector located in a plenum chamber defined by the vehicle rigid body structure. The air ejector may conveniently by operated by high pressure air bled from a compressor stage of a gas turbine engine located on the A.C.V. Because it is capable of causing rapid buildup and decay of large volume flows of air, an air ejector powered by high pressure air can produce, in simple and easily controlled manner, rapid inflation of the inflatable member. This inflatable member is similar in operation to so-called skirt 'muscle' devices which are the subject of our co-pending U.S. patent application Ser. No. 281,247 filed July 7, 1981.

Skirt 'muscle' devices may be incorporated into other areas of inflatable wall structures on an A.C.V. embodying the present invention to effect changes in the geometry of the inflatable wall structure that are independent of or supplemental to geometry changes effected using the present invention.

DESCRIPTION OF THE PREFERRED EMBODIMENTS

Figure 1:
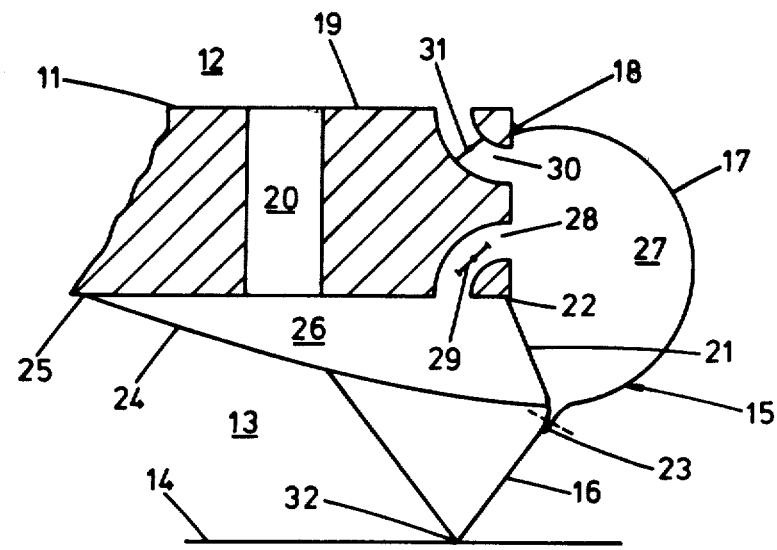
FIG. 1 is a transverse cross-section through rigid structure of an A.C.V. to which is attached an inflatable skirt structure of the bag and fingers type in a first embodiment of the invention and with the skirt fully inflated.
Figure 2:
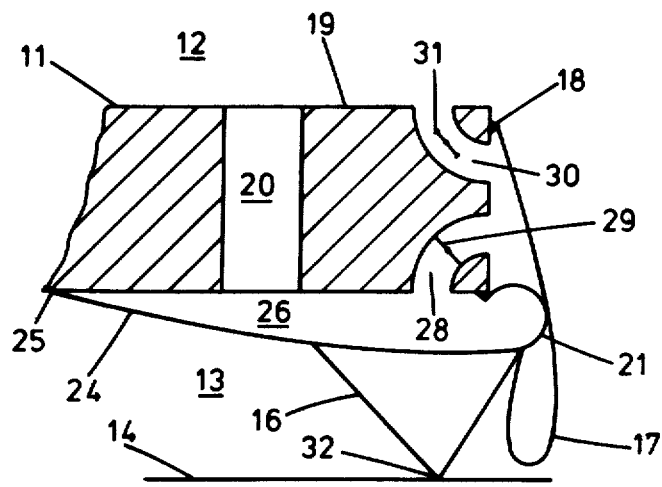
FIG. 2 is a view similar to FIG. 1 but with the skirt partly inflated.

Referring to FIGS. 1 and 2, the rigid body structure of an A.C.V. (not shown in full) generally includes a buoyancy tank 11 that, together with other structure (not shown) defines a plenum chamber 12 into which pressurised air is delivered by one or more lift fans (not shown). Sealing means for preventing lateral escape of an air cushion 13 formed between the underside of the buoyancy tank 11 and a surface 14 over which the A.C.V. operates, includes an inflatable skirt structure comprised by an inflatable bag member 15 to the underside of which is attached a plurality of fingers 16.

In transverse cross-section the bag member 15 comprises an outer sheet 17 of reinforced elastomeric material, for example, neoprene sheet reinforced with woven nylon fabric, attached at one edge by hinged attachment means (not shown) along an attachment line 18 to rigid structure 19 which is disposed outboard of the buoyancy tank 11 and which defines with the buoyancy tank a duct 20. The opposite edge of the sheet 17 is attached to the lower edge of a web member 21 also formed from reinforced elastomeric material, and having its upper edge attached to the rigid structure 19 by hinged attachment means (not shown) along an attachment line 22. The lower portion of the sheet 17 and web 21 form an apron 23 to which upper outer parts of the fingers 16 are attached. A sheet of reinforced elastomeric material 24 attached at one edge to the web 21, extends inwardly to have its opposite edge attached to the underside of the buoyancy tank 11 by hinged attachment means (not shown) along an attachment line 25. The sheets 17 and 24 enclose with the rigid structure 19 and the buoyancy tank 11 a space which is divided by the web 21 into an inboard compartment 26 and an outboard compartment 27.

A duct 28 in the rigid structure 19 provides communication between the compartments 26 and 27, and is adapted for closure (as shown in FIG. 2) by a valve member 29. A duct 30 in the rigid structure 19 communicates the outboard compartment 27 with ambient and is adapted for closure (as shown in FIG. 1) by a valve member 31.

In operation pressurised air flows from the plenum chamber 12 through the duct 20 to the inboard compartment 26 and, with the valve member 29 in the open position as shown in FIG. 1, some of this air flows through the duct 28 to the outboard compartment 27. With the valve member 31 in a position closing the duct 30 both of the sheets 17 and 24 are inflated outwardly away from the rigid structure 19 and the buoyancy tank 11 so that the bag member 15 assumes the geometry shown in FIG. 1. With the air pressure in the inboard and outboard compartment equal the web 21 extends in a straight line between its attachment to the rigid structure 19 and its attachment to the sheets 17 and 24.

Pressurised air for the air cushion 13 may be supplied from the inboard compartment 26 by way of holes (not shown) in the sheet 24, or may be supplied by additional ducts (not shown) communicating the plenum chamber 12 with the air cushion 13 through the buoyancy tank 11. Cushion air inflates the fingers 16 to the geometry shown so that they extend downwardly from the bag member 15 to terminate near to the surface 14 at tip portions which together define a skirt hemline 32.

Should it be required to move the skirt hemline 32 along one side of the A.C.V. in an upward and outward direction, e.g. for assisting in directional control, then this can be accomplished by closing the valve member 29 to isolate the inboard compartment 26 from the outboard compartment 27, and opening the valve member 31 so that inflation air in the outboard compartment 27 is vented to ambient through the duct 30. The sheet 17 of the bag member 15 then assumes a deflated configuration, as shown in FIG. 2, and, because the air pressure on the inboard side of the web 21 is now higher than the air pressure on the outboard side thereof, the web 21 is inflated outwardly to a curved configuration as shown in FIG. 2 thereby moving the fingers 16, and hence the skirt hemline 32, in an upward and outward direction.

By deflating the outboard compartment 27 on both sides of an A.C.V. the overall beam dimension of vehicle can be reduced whilst retaining an air cushion of reduced height beneath the vehicle to facilitate slow speed manoeuvring in confined spaces.

Figure 3:
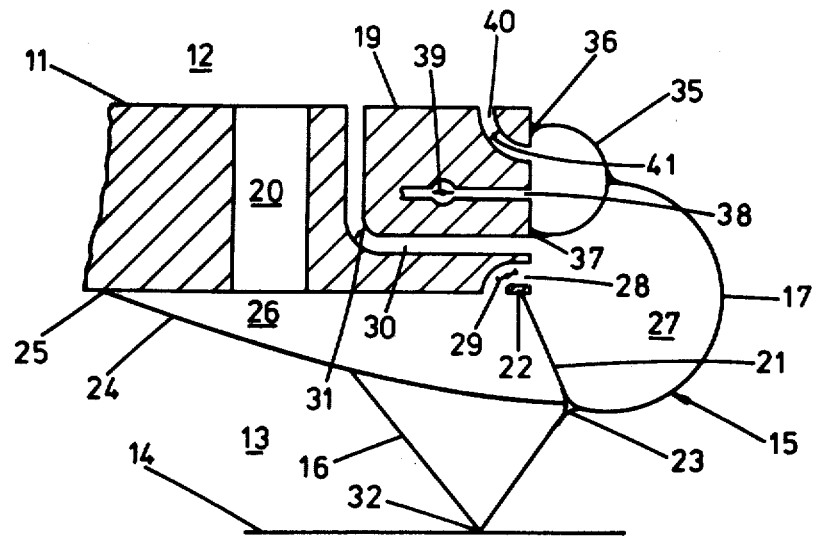
FIG. 3 is a transverse cross-section through rigid structure of an A.C.V. to which is attached an inflatable skirt structure of the bag and fingers type in a second embodiment of the present invention and with the skirt fully inflated.
Figure 4:
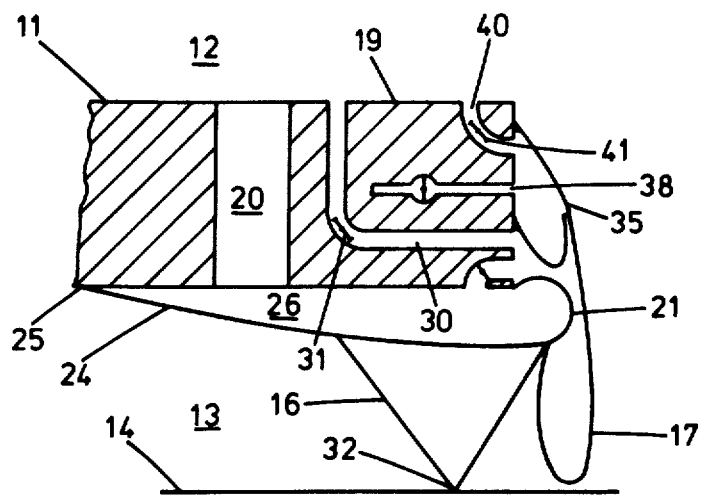
FIG. 4 is a view similar to FIG. 3 but with the skirt partly inflated.

In an embodiment of the invention shown in FIGS. 3 and 4 the inflatable skirt structure is of bag and fingers construction similar to the inflatable skirt structure hereinbefore described with reference to and shown in FIGS. 1 and 2, so that like components are identified by like reference numerals. However, in the embodiment of FIGS. 3 and 4 attachment of the outer sheet 17 of the bag member 15 is to an inflatable member 35 comprised by reinforced elastomeric sheet material having opposed edges attached by suitable attachment means (not shown) along attachment lines 36 and 37 which are spaced from each other on the rigid structure 19. The inflatable member 35 encloses with the rigid structure 19 a space into which pressurised air may be introduced through a duct 38 to inflate the member 35. A valve member 39 is adapted for closing the duct 38 as shown in FIG. 4. A further duct 40 communicates the space enclosed by the member 35 and rigid structure 19 with ambient, and a valve member 41 is adapted for closing the duct 40 as shown in FIG. 3. Pressurised air for causing rigid inflation of the member 35 is supplied by an air ejector (not shown) located in the plenum chamber and conveniently operated by high pressure air bled from the compressor stage of a gas turbine located on the A.C.V. to induce a large volume flow of pressurised air from the plenum chamber 12 into the space enclosed by the member 35 and the rigid structure 19.

In operation, with the valve member 39 in duct 38 open and the valve member 41 in duct 40 closed, the member 35 is inflated and the skirt wall structure takes on the geometry shown in FIG. 3. The geometry of the skirt wall structure may be changed by deflating the member 35 either by itself or together with deflation of the outboard compartment 27 of the bag member 15. Deflation of the member 35 is brought about by closing valve 39 to isolate member 35 from plenum air pressure and opening valve 41 in duct 40 to vent inflation air in the member 37 to ambient. Deflation of the outboard compartment 27 of the bag member 15 is by closure of valve member 29 in duct 28 and opening of valve member 31 in duct 30, as previously described with reference to the embodiment shown in FIGS. 1 and 2.

The action of the inflatable member 35 in effecting a change in the geometry of the skirt wall structure is similar to the action of a device known to us as a skirt 'muscle' which may also be used to effect changes in the geometry of a skirt wall structure. A skirt 'muscle' is disclosed in our co-pending U.S. patent application Ser. No. 281,247 filed July 7, 1981, and may be incorporated in the skirt wall structure at other locations, for example in the sheet 24 of the bag member 15 near to the attachment line 25, and may be used to effect changes in skirt geometry which are independent of or supplemental to changes effected by use of the present invention.

What is claimed is:

1. An A.C.V. having cushion sealing means at least partly constituted by an inflatable skirt structure comprising an inflatable bag member constructed from flexible impermeable sheet material attached to rigid body structure of the A.C.V. along attachment lines that are spaced apart and one of which is situated outboard of the other so as to enclose with said rigid body structure a space, a flexible impermeable web member having a first edge attached to the rigid body structure and a second opposed edge attached to the bag member along respective attachment lines on the rigid body structure and the bag member that are spaced between and substantially parallel with the attachment lines of the bag member to the rigid body structure and whereby said space enclosed by said bag member and said rigid body structure is divided into inboard and outboard compartments with the volume of said outboard compartment being disposed substantially outboard of the rigid body structure of the A.C.V. when the bag member is inflated, first duct means communicating between a source of pressurized air on said A.C.V. and said inboard compartment, second duct means communicating between said inboard and outboard compartments, third duct means communicating said outboard compartment to ambient, first valve means co-operating with said second duct means and adapted for closing said second duct means, and second valve means co-operating with said third duct means and adapted to control venting of said outboard compartment to ambient, said first and second valve means being controllable to vary the inflation pressure of said outboard compartment and thereby to effect changes in the geometry of the flexible skirt structure.

2. An A.C.V. as claimed in claim 1, wherein said first, second and third duct means are each provided in said rigid body structure of the A.C.V.

3. An A.C.V. as claimed in claim 1, wherein the bag member is attached to said rigid body structure along said outboard attachment line by an inflatable member comprised by flexible impermeable sheet material extending between spaced lines of attachment on the vehicle rigid body structure to enclose with said rigid body structure a space, duct means communicating said space with a source of pressurised air on A.C.V., whereby said inflatable member may be inflated to move said outboard attachment line of said bag member outwardly with respect to said rigid body structure, and valve means co-operating with said duct means and adapted for closing said duct means.

4. An A.C.V. as claimed in claim 3, wherein a further duct means communicates the space enclosed by said inflatable member and said rigid body structure with ambient, and valve means co-operating with said further duct means and adapted for closing said further duct means.

5. An A.C.V. as claimed in claim 3 or claim 4, wherein said source of pressurised air for inflating said inflatable member comprises an air ejector located in a plenum chamber defined by the vehicle rigid body structure and to which plenum chamber pressurised air is supplied by one or more vehicle lift fans.

6. An air cushion vehicle as claimed in claim 5, wherein said air ejector is adapted for operation by high pressure air bled from a compressor stage of a gas turbine engine located on the A.C.V.

* * * * *